May 17, 1960
M. TELKES
2,936,741
TEMPERATURE STABILIZED FLUID HEATER AND A COMPOSITION
OF MATTER FOR THE STORAGE OF HEAT THEREFOR
Filed May 1, 1957
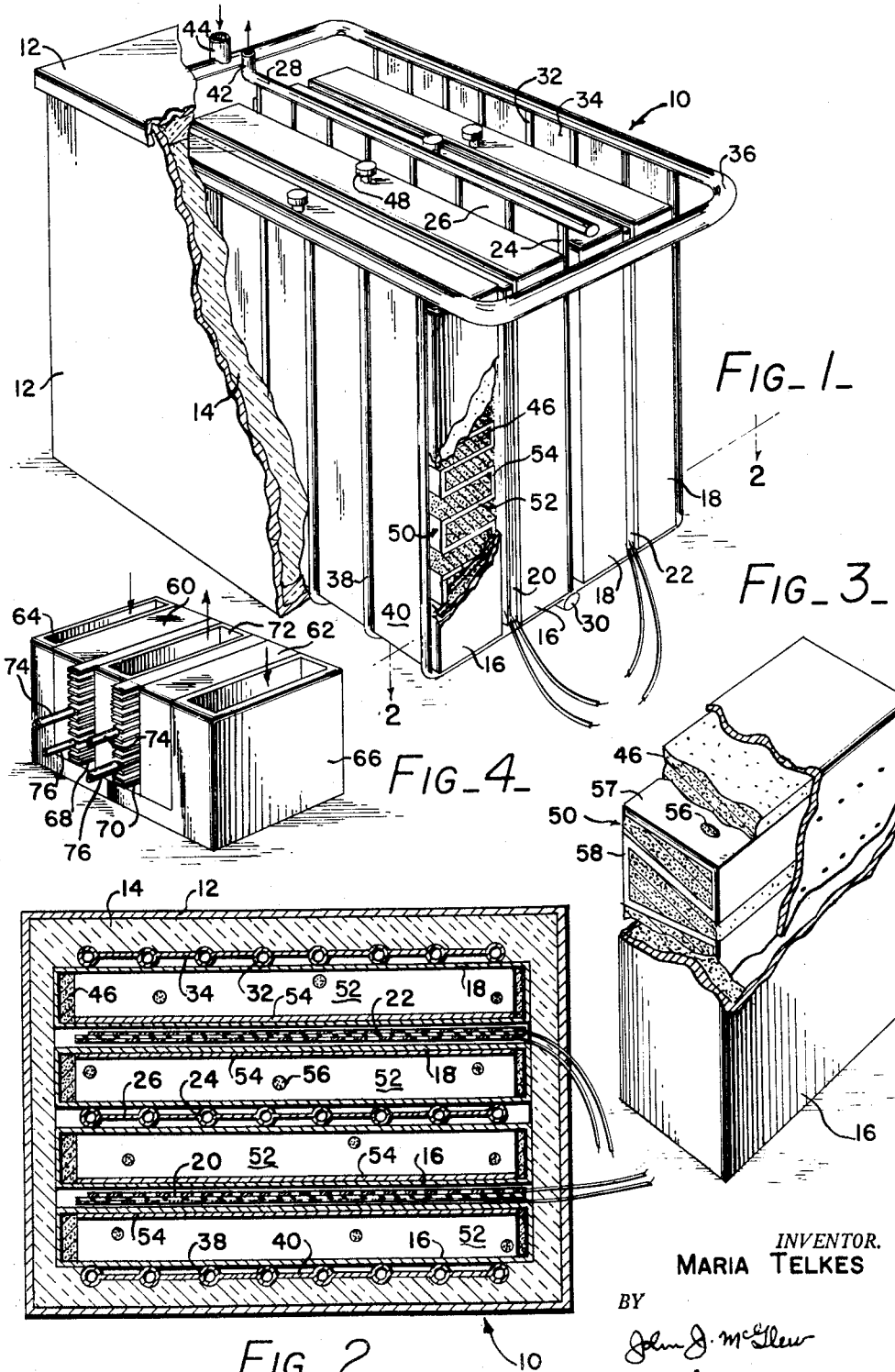
INVENTOR.
MARIA TELKES
BY
John J. McGlew
ATTORNEY

United States Patent Office 2,936,741
Patented May 17, 1960

2,936,741

TEMPERATURE STABILIZED FLUID HEATER AND A COMPOSITION OF MATTER FOR THE STORAGE OF HEAT THEREFOR

Maria Telkes, New York, N.Y.

Application May 1, 1957, Serial No. 656,438

7 Claims. (Cl. 122—32)

This invention relates in general to fluid heaters and to a composition of matter for the storage of heat for inclusion therein, and particularly to an improved new and useful fluid heater particularly adapted for use with a temperature stabilizing material and to a new and useful temperature stabilizing composition of matter therefor.

In applicant's Patents 2,595,905 issued May 6, 1952, and 2,677,243, 2,677,367 and 2,677,664 issued May 4, 1954, there are disclosed and claimed many materials for use in the storage of heat together with application of such heat storage. The materials described include those which have applications at temperature ranges of approximately 80° to 140° F.

In accordance with one aspect of this invention it has been discovered that a material exists which gives off approximately 100 B.t.u.'s per pound latent heat of fusion at its melting temperature which is within the range of 140° to 180° F., depending on the proportions of the constituents. Such a material is trisodium phosphate dodecahydrate and sodium hydroxide, which, when mixed in the preferred percentages in accordance with this invention, will give up approximately 100 B.t.u.'s per pound at approximately 158° F. and will completely liquefy below 200° F. The mixture will repeatedly crystallize and liquefy with successive cooling and heating.

Before this present invention the large heat storing capacity of trisodium phosphate dodecahydrate provided by this invention was not practically or regularly available because of the variation in its crystallization. While the material might at about 158° F. give up almost the full amount of its maximum latent heat content during one or two heating and cooling cycles of operation, the difficulty had been that sooner or later a cycle would be reached in which the material would not crystallize properly and give up only a part of this stored latent heat at the desired temperature and the rest over a wide unpredictable temperature range.

In accordance with another aspect of this invention a fluid heater has been constructed which is particularly adapted for use with such a heat storage material in the temperature range of from 140° to 180° F. and which will provide instantaneous economical heating for air, water or other fluids.

Accordingly, it is an object of this invention to provide a new and useful fluid heater.

A further object of this invention is to provide a new and useful fluid heater having a plurality of heat storage compartments constructed with internal fins particularly arranged to permit repeated cyclical solidification and liquefication of heat storage material therein in order to effectively store heat for instant use.

A further object of this invention is to provide a new and useful composition of matter for the storage of heat.

A further object of this invention is to provide a fluid heater which is simple in design, rugged in construction and economical to manufacture.

In this specification and the accompanying drawings, there are described and shown various embodiments of the methods and apparatus of the invention and various modifications thereof are indicated, but it is to be understood that these are not intended to be exhaustive nor limiting of the invention, but on the contrary, are given for purposes of illustration in order that others skilled in the art may fully understand the invention and the manner of applying the composition of matter and apparatus for manufacturing heat storage fluid heaters, and so that they may modify and adapt the invention in various forms, each as may be best suited to the conditions of a particular use.

The various advantages and objects of the present invention will be more fully understood from a consideration of the following specification in conjunction with the accompanying drawings, in which:

Figure 1 is a perspective view partially broken away of a liquid heater constructed in accordance with this invention;

Figure 2 is a horizontal section taken on the line 2—2 of Figure 1;

Figure 3 is a fragmentary perspective view partially broken away of a heat storage container showing another embodiment of container fin arrangement; and Figure 4 is a perspective view of another embodiment of fluid heater particularly adapted for heating gases.

Referring to the drawings in particular the invention as embodied therein includes a liquid heater generally designated 10 having an outer covering 12 lined with insulation 14. Arranged inside the covering 12 in a grid block pattern are two pairs of heat storage containers 16, 16 and 18, 18. The pair 16, 16 is separated by an electric heating panel 20 comprising a grid of electrical resistance wires held in suitable insulation, and the pair 18, 18 is separated by a similar electric heating panel 22.

Between the pairs of heat storage containers 16, 16 and 18, 18 is an assembly of a plurality of tubes 24 interconnected by a thin metal sheet 26 (so-called "Tube-In-Strip") and connected to communicate with a large horizontally disposed upper header 28 and a similar lower header 30. Arranged adjacent the outside face of the outer one of the heat storage containers 18, 18 are a plurality of tubes 32, arranged in a metal sheet 34 and communicating with an upper header 36. The tubes 32 and metal sheet 34 extend around the bottom of the heat storage containers 18, 18 into communication with the lower header 30. The header 36 is substantially rectangular in plan and extends around the grid assembly of the heat storage containers 16, 16 and 18, 18 with a portion in vertical alignment with the outer side face of the outer heat storage container 16. A plurality of tubes 38 held in a metal sheet 40 interconnect the portion of the header 36 adjacent the side face of the heat storage container 16 and extend downwardly along the face and the bottom thereof, and are connected to the lower header 30. The header terminates in a discharge connection 42 which extends through the top of the covering 12, and the header 36 terminates in an inlet connection 44 which also extends through the top of the covering 12.

In accordance with the invention, the pairs of heat storage containers 16, 16 and 18, 18 are filled with a heat storage material 46 by first heating the material to a liquid state and then pouring the salt into fill openings 48 located at the tops of the containers. The interiors of each of the heat storage containers 16 and 18 are provided with a plurality of fins 50 formed from a solid metal sheet by bending. When inserted into the containers the fins form a plurality of horizontally disposed surfaces 52 and short vertical surfaces 54 adjacent the walls of the containers. The fins do not extend to the side walls of the containers so that when the containers are filled through the fill openings 48 the liquid heat storage material will flow downwardly along the sides of the bottom of the container and fill it completely. Offset holes 56 in the horizontal portions 52 of the fins 50 provide additional tortuous paths to the container bottoms for the heat storage material for filling purposes.

It has been discovered in accordance with the invention that a material such as trisodium phosphate dodecahydrate ($Na_3PO_4 \cdot 12H_2O$) has a latent heat of fusion of approximately 100 B.t.u.'s per pound available for heat transfer at a melting temperature between 140° to 180° F. provided there are no variations in its crystallization as it gives up its latent heat. Trisodium phosphate, on cooling from a higher temperature, may at about 158° F. crystallize into at least two hydrate forms, one a dodecahydrate ($12H_2O$) and another the decahydrate ($10H_2O$). If all of the trisodium phosphate can be caused to crystallize into the dodecahydrate form ($Na_3PO_4 \cdot 12H_2O$) the full heat content can be extracted at substantially a constant temperature of approximately 158° F. To the extent that the decahydrate forms, the heat is given up over a range of temperatures extending well below 158° F. and only as much as one-third of the stored heat may be advantageously used or recovered. The formation of a decahydrate also results in a large increase in the volume of the material which might have the undesirable result of breaking its container.

It has been discovered that certain materials are useful in stabilizing crystallization and increasing the rate of crystallization and the rate of heat recovery. Such a material as sodium hydroxide for example acts as an agent in promoting the crystallization of the trisodium phosphate as soon as the hot solution is cooled to approximately 158° F.

Trisodium phosphate dodecahydrate ($Na_3PO_4 \cdot 12H_2O$) melts at around 70° C. or 158° F. It dissolves completely in its water of crystallization at 75° C. or 167° F. forming a clear solution without sediment. A preferred composition of matter which liberates a considerable amount of B.t.u.'s at a constant temperature within the range of from 140° F. to 180° F., is a mixture containing 30% to 35% trisodium phosphate (anhydrous), up to 15% sodium hydroxide and the balance water. An example of two such mixtures is indicated in the following table:

| Material | Percent by Weight | |
|---|---|---|
| | A | B |
| $Na_3PO_4$ (anhydrous) | 34 | 31 |
| Water | 62 | 62 |
| NaOH | 4 | 7 |

Trisodium phosphate decahydrate ($Na_3PO_4 \cdot 10H_2O$), which might form on successive reheating and cooling of the trisodium phosphate dodecahydrate when no nucleating agent is present, comprises 48% trisodium phosphate and 52% water. When this material is heated it fails to dissolve even above 80° C. or 176° F. When it is placed in the container and cooled and reheated the container frequently cracks due to the expansion of the material. Sodium hydroxide promotes the crystallization of the trisodium phosphate into the dodecahydrate form by aiding in the formation of the correct crystal form nuclei, and increases the rate of liberation of the latent heat of fusion.

Sodium hydroxide is inexpensive. It melts around 318° C. or 604° F. with a relatively high heat of fushion. In addition it undergoes a solid phase change or a transition from one crystal form to another at around 300° C. or 572° F. In the presence of water its melting and transition temperatures decrease.

Satisfactory crystallization of trisodium phosphate dodecahydrate may be achieved with an addition of up to 15% of sodium hydroxide to trisodium phosphate dodecahydrate. However, the most desirable results were obtained with 5% sodium hydroxide to trisodium phosphate dodecahydrate. This salt mixture including 5% sodium hydroxide melts at around 158° F. and boils at around 226° F.

The operation of the liquid heater is as follows: electrical energy is supplied to the panel heaters 20 and 22 which heat the heat storage containers 16 and 18 and effect melting of the preferred trisodium phosphate dodecahydrate and sodium hydroxide mixture of heat storage material therein. The heat can be applied at low rates over long periods of time preferably at off-peak rate periods. It has been found that the heavier solids in the mixture upon melting tend to collect near the bottoms of the containers 16 and 18. In accordance with an aspect of the invention the fins 50 effectively prevent the collecting of the heavier solids at the bottoms of the containers. The fins form a plurality of barriers which prevent the complete precipitation of the heavier solids to the bottom of the containers 16 and 18 during the periods when the heat storage material is liquid.

In accordance with one aspect of fin construction (Figures 1 and 2) the fins 50 do not extend completely to the sides of the containers so that for filling purposes the liquid trisodium phosphate mixture may be poured into the containers and fill them completely by flowing around the sides of the fins to the bottom as well as through the holes 56. In some instances it has been found desirable to form the fins in the design shown in Figure 3 and make them co-extensive with the width and length of the storage containers 16 and 18. In this instance a plurality of offset holes 56 are provided to permit filling of the container only by flow downwardly through the holes. In the Figure 3 construction the fins are formed with slanting surfaces 57 connected by short vertical surfaces 58. Both constructions advantageously prevent settling of heavy heat storage solids during the repetitive heating and cooling cycles. The slanting surfaces 57 in addition to preventing solid settling, also prevent run out of the salt in the event the containers leak. In cases where it is desired to reinforce heat storage containers 16 and 18 the fins are welded to the container walls.

After the heat storage materials have been heated above their melting point, there is a considerable amount of latent heat available to instantaneously heat fluids, which are circulated in heat exchange relationship with the heat storage containers, by cooling of the salts below their melting point. The invention finds particular application in the heating of water to temperatures in the range of 140° to 180° F. Water may be heated instantaneously by circulating the water around the heat storage materials and rapidly withdrawing the latent heat which is stored in the material.

Another embodiment of fluid heater particularly adaptable for heating gases such as air, is shown in Figure 4 and includes two block-shaped heat storage containers 60 and 62 arranged with an outside face against inlet air ducts 64 and 66, respectively, and an inside face adjacent a liquid heat exchanger element 68 and 70, respectively. The air ducts 64 and 66 extend downwardly around the bottom of the respective containers 60 and 62 and the bottom of the heat exchanger elements 68 and 70 and communicate with a discharge air passage 72 which extends upwardly between the heat exchanger elements.

The liquid heat exchanger elements 68 and 70 are supplied with heated liquid, such as water heated by the sun in a solar collector, for example, through inlets 74, 74. The liquid is circulated through the inlets 74 and internal passages in the heat exchanger elements 68 and 70 where the heat of the water is transferred to the storage materials in the heat storage containers 60 and 62; and then the cooled liquid is discharged through outlets 76, 76. Air or other gases to be heated are circulated downwardly through the inlet air passages 64 and 66, where the heat stored in the heat storage materials by melting them with heat supplied by the heat exchanger elements 68 and 70 is given up to the air. Additional heat is imparted to the air by the heating elements 68 and 70 as the air is directed upwardly through the discharge passage 72.

Thus the invention provides a means for heating large quantities of liquids or gases instantaneously. A heater constructed in accordance with this invention will be much smaller than similar heaters of the same capacity because high quantities of heat can be stored in the heat storage materials for instant use and it will be decidedly more economical to operate because waste heat and heat energy available at off-peak rates can be stored for times when it is desired to use it. The heat storage material described for use therewith is particularly adaptable for the practical temperature ranges expected.

While in accordance with the provisions of the statutes there is illustrated and described herein the best forms of the invention now known, those skilled in the art will understand that changes may be made in the form of the apparatus disclosed without departing from the spirit of the invention covered by the claims.

What is claimed is:

1. A heat storage material comprising about 31 to 34 percent trisodium phosphate, about 4 to 7 percent sodium hydroxide, and the balance water.

2. A method of storing and recovering heat comprising heating a heat storage material comprising about 31 to 34 percent trisodium phosphate, about 4 to 7 percent sodium hydroxide, and the balance water to a temperature above its melting point to store heat; and cooling said heat storage material to a temperature below its melting point to recover the stored heat.

3. Apparatus for storing heat for subsequent recovery comprising, in combination, a container having therein a heat storage material comprising about 31 to 34 percent trisodium phosphate, about 4 to 7 percent sodium hydroxide, and the balance water; means for heating said heat storage material to a temperature above its melting point; and means for withdrawing heat from said heat storage material whenever desired.

4. An apparatus as defined in claim 3 wherein said container is vertically elongated and has a plurality of substantially horizontal heat conductive baffle means therein to inhibit settling of solids to the bottom of the container and to rapidly interchange heat between the interior of the heat storage material and the surfaces of the container.

5. In an apparatus for storing heat by melting a fusible hydrated salt within a container and recovering heat by crystallization of said salt, the improvement comprising a vertically elongated container having a heat storage material comprising a fusible hydrate salt therein and further having a plurality of spaced super-imposed substantially horizontal heat conductive baffle means therein to inhibit settling of solids to the bottom of the container and to rapidly interchange heat between the interior of the heat storage material and the side surfaces of the container.

6. An apparatus as defined in claim 5 wherein said baffle means comprise a plurality of vertically spaced, substantially horizontal metallic plates substantially coextensive with the interior of said container.

7. An apparatus as defined in claim 5 including means to heat said heat storage material to a temperature above its melting point; and means for withdrawing heat from said heat storage material whenever desired.

References Cited in the file of this patent

UNITED STATES PATENTS

| | | |
|---|---|---|
| 1,890,453 | Bowman | Dec. 13, 1932 |
| 2,656,821 | Ray | Oct. 27, 1953 |
| 2,660,155 | Chapman | Nov. 24, 1953 |
| 2,706,716 | Howe | Apr. 19, 1955 |
| 2,791,204 | Andrus | May 7, 1957 |
| 2,827,438 | Broadley | Mar. 18, 1958 |

OTHER REFERENCES

Handbook of Chemistry and Physics, 25th ed., page 458, 1941.